US012578597B2

(12) United States Patent
Geng et al.

(10) Patent No.: US 12,578,597 B2
(45) Date of Patent: Mar. 17, 2026

(54) BACKLIGHT MODULE, DISPLAY MODULE, DISPLAY DEVICE, AND ANTI-PEEPING DRIVING METHOD

(71) Applicants:Chongqing BOE Optoelectronics Technology Co., Ltd., Chongqing (CN); BOE TECHNOLOGY GROUP CO., LTD., Beijing (CN)

(72) Inventors: Yuxu Geng, Beijing (CN); Yong Deng, Beijing (CN); Lan Xin, Beijing (CN); Yansheng Sun, Beijing (CN); Hebing Ma, Beijing (CN); Song Liu, Beijing (CN); Lv Lv, Beijing (CN); Yuan Xia, Beijing (CN); Xiaozhen Fan, Beijing (CN); Zhen Peng, Beijing (CN); Longbo Huang, Beijing (CN); Hong Wang, Beijing (CN); Can Tang, Beijing (CN); Haixu Zou, Beijing (CN); Jian Chen, Beijing (CN); Xinzhi Shao, Beijing (CN); Pingjia Yu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/728,892

(22) PCT Filed: Apr. 21, 2023

(86) PCT No.: PCT/CN2023/089923
§ 371 (c)(1),
(2) Date: Jul. 15, 2024

(87) PCT Pub. No.: WO2023/216849
PCT Pub. Date: Nov. 16, 2023

(65) Prior Publication Data
US 2025/0147348 A1    May 8, 2025

(30) Foreign Application Priority Data
May 7, 2022    (CN) ......................... 202210494950.9

(51) Int. Cl.
*F21V 8/00* (2006.01)
*G02B 6/00* (2006.01)
(Continued)

(52) U.S. Cl.
CPC ......... *G02F 1/1323* (2013.01); *G02B 6/0053* (2013.01); *G02F 1/133528* (2013.01)

(58) Field of Classification Search
None
See application file for complete search history.

(56) References Cited

U.S. PATENT DOCUMENTS 6,898,012 B2 * 5/2005 Kaminsky ............ G02B 5/0221
359/619

FOREIGN PATENT DOCUMENTS

| CN | 1501144 A | 6/2004 |
| CN | 101441281 A | 5/2009 |

(Continued)

OTHER PUBLICATIONS

Office Action issued on Nov. 27, 2025 in Chinese Patent Application No. 202210494950.9, (24 pages; with English abstract).

*Primary Examiner* — Joseph L Williams
(74) *Attorney, Agent, or Firm* — XSENSUS LLP

(57)    ABSTRACT

A backlight module includes a light guide plate and a prismatic reflective film. The prismatic reflective film is disposed on a surface of the light guide plate opposite to a light exit surface of the light guide plate. A surface of the (Continued)

reflective film proximate to the light guide plate is provided with a plurality of protruding structures thereon. The plurality of protruding structures extending in a first direction. Tops of at least two of the plurality of protruding structures are uneven.

20 Claims, 4 Drawing Sheets

(51) Int. Cl.
G02F 1/13 (2006.01)
G02F 1/1335 (2006.01)

(56) References Cited

FOREIGN PATENT DOCUMENTS

| | | |
|---|---|---|
| CN | 102237044 A | 11/2011 |
| CN | 104808372 A | 7/2015 |
| CN | 204883126 U | 12/2015 |
| CN | 107505794 A | 12/2017 |
| CN | 211237684 U | 8/2020 |
| CN | 113204141 A | 8/2021 |
| CN | 218099682 U | 12/2022 |
| TW | 1737269 B | 8/2021 |
| WO | 2018/137333 A1 | 8/2018 |

\* cited by examiner

200~1000
3024   3023   3022   3021        302b
70
60
100
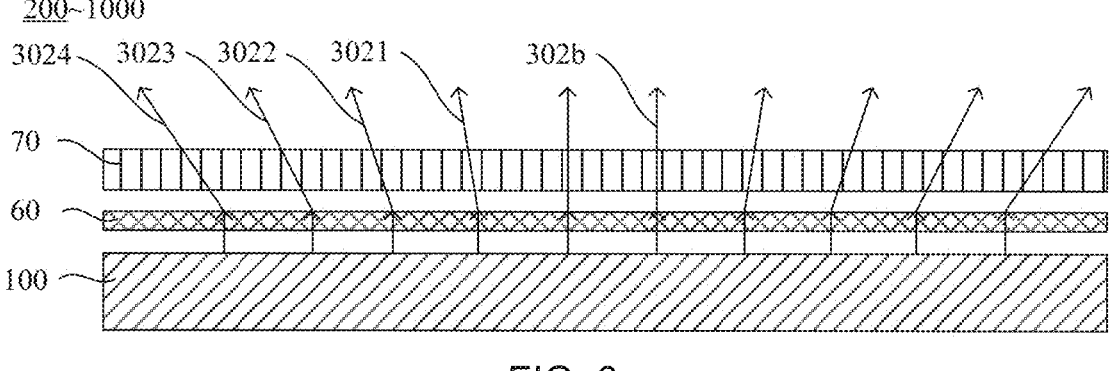
FIG. 6
200~1000
703
702 { 702b
       702a
70 { 701
602 } 60
601
100
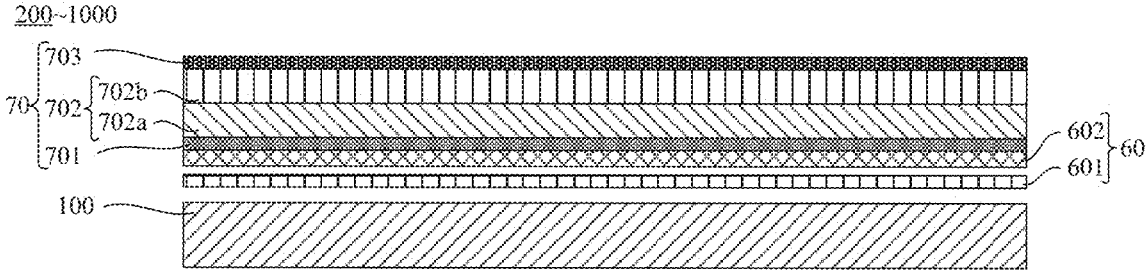
FIG. 7
200~1000
703
702 { 702b
       702a
70 { 701
602 } 60
601
100
FIG. 8

BACKLIGHT MODULE, DISPLAY MODULE, DISPLAY DEVICE, AND ANTI-PEEPING DRIVING METHOD

CROSS-REFERENCE TO RELATED APPLICATIONS

This application is a national phase entry under 35 USC 371 of International Patent Application No. PCT/CN2023/089923, filed on Apr. 21, 2023, which claims priority to Chinese Patent Application No. 202210494950.9, filed on May 7, 2022, which are incorporated herein by reference in their entirety.

TECHNICAL FIELD

The present disclosure relates to the field of display technologies, and in particular, to a backlight module, a display module, a display device and an anti-peeping driving method.

BACKGROUND

With the popularity of mobile computers, tablets, mobile phones and other mobile devices, more and more people like to work or use mobile devices to pass the time in public places, such as subways and high-speed rails. Since the display device of the mobile device has a wide viewing angle and high quality display images, when using mobile devices in public places, other people besides the user can also clearly see the display image on the display device, which can easily lead to the leakage of business secrets and personal privacy, resulting in losses.

SUMMARY

In an aspect, a backlight module is provided. The backlight module includes a light guide plate and a prismatic reflective film. The prismatic reflective film is disposed on a surface of the light guide plate opposite to a light exit surface of the light guide plate, a surface of the reflective film proximate to the light guide plate is provided with a plurality of protruding structures thereon, the plurality of protruding structures extending in a first direction, and tops of at least two of the plurality of protruding structures are uneven.

In some embodiments, the prismatic reflective film includes a base film and the plurality of protruding structures disposed on a side of the base film, and in a first sectional view obtained by taking a cross-section perpendicular to the base film and parallel to the first direction and passing through a top of a protruding structure of the plurality of protruding structures, the top of the protruding structure is wavy.

In some embodiments, in the first sectional view, a distance between the top of the protruding structure and the base film changes cyclically, the top of the protruding structure has at least two highest positions and at least two lowest positions, and the at least two highest positions and the at least two lowest positions are alternately arranged.

In some embodiments, a protruding structure of the plurality of protruding structures includes a first surface and a second surface that intersect, a position where the first surface and the second surface intersect is a top of the protruding structure, and at least one of the first surface and the second surface is a wavy curved surface.

In some embodiments, in the first sectional view, the top of the protruding structure has a highest position and a lowest position, and a difference between a distance between the highest position and the base film and a distance between the lowest position and the base film is less than half of the distance between the highest position and the base film.

In some embodiments, the plurality of protruding structures are arranged in a second direction, and the second direction intersects the first direction; in a second sectional view obtained by taking a cross-section perpendicular to a base film included in the prismatic reflective film and parallel to the second direction, a distance between tops of each two adjacent protruding structures is same.

In some embodiments, in the second sectional view, a top of a protruding structure of the plurality of protruding structures has a rounded corner.

In some embodiments, the base film is a soft resin base, and a thickness of the base film is in a range from 30 μm to 200 μm, inclusive.

In some embodiments, the plurality of protruding structures include a plurality of first protruding structures and a plurality of second protruding structures, shapes of a first protruding structure of the plurality of first protruding structures and a second protruding structure of the plurality of second protruding structures are different, the plurality of first protruding structures and the plurality of second protruding structures are alternately arranged in a second direction, and the second direction intersects the first direction.

In some embodiments, a highest position of the first protruding structure in a third sectional view obtained by taking a cross-section perpendicular to a base film included in the prismatic reflective film and parallel to the first direction and passing through a top of the first protruding structure, corresponds to, a lowest position of the second protruding structure in a fourth sectional view obtained by taking a cross-section perpendicular to the base film and parallel to the first direction and passing through a top of the second protruding structure, in the second direction.

In some embodiments, the backlight module further includes a backplate disposed on a side of the prismatic reflective film away from the light guide plate, and a surface of the backplate is provided with a light-absorbing coating thereon.

In some embodiments, the backlight module further includes a light source. The light source includes a base plate and a light-emitting device disposed on the base plate. The light-emitting device is disposed at an end of the light guide plate, and the base plate is disposed on a surface of the light guide plate opposite to the light exit surface of the light guide plate and is disposed at an end of the prismatic reflective film. Overlapping portions of the base plate and the light guide plate are connected by a first adhesive layer. A second adhesive layer is provided on at least a position where a surface of the base plate away from the light guide plate and a surface of the prismatic reflective film away from the light guide plate are close to each other.

The prismatic reflective film serves as a reflective sheet to reflect the light emitted from a surface of the light guide plate opposite to the light exit surface of the light guide plate, i.e., the back side, into the light guide plate, to ensure the light to be emitted from the light exit surface of the light guide plate.

In another aspect, a display module is provided. The display module includes a dimming structure, a display panel and the backlight module as mentioned in any one of the above embodiments. In the backlight module, the light guide plate is a collimated light guide plate, and the light guide plate is configured to emit light entering an interior of the light guide plate perpendicularly from the light exit surface. The dimming structure is disposed on a light exit surface of the backlight module, and the dimming structure is used to adjust an angle of light emitted from the light exit surface of the light guide plate. The display panel is disposed on a side of the dimming structure away from the backlight module, and the display panel is used to perform display by using light emitted by the dimming panel.

In some embodiments, the display panel includes a first polarizer, a display liquid crystal panel and a second polarizer that are stacked in sequence, and the first polarizer is closer to the backlight module than the second polarizer. The dimming structure includes a dimming panel and a dimming film, and the dimming film is disposed on a side of the dimming panel away from the display panel. The display panel and the first polarizer are combined into a one-piece structure; alternatively, the dimming film, the dimming panel and the first polarizer are combined in to a one-piece structure.

In some embodiments, the display module further includes a backlight driver chip and a light dimming driver chip. The backlight driver chip is electrically connected to the backlight module, and the dimming driver chip is electrically connected to the dimming panel. The backlight driver chip is configured to control a luminance of the backlight module, and the dimming driver chip is configured to control an angle of light emitted by the dimming panel to control the display module to switch between a sharing state and an anti-peeping state.

In some embodiments, the dimming driver chip is configured to output a dimming driving signal to the dimming panel to control the angle of light emitted by the dimming panel; information carried by the dimming drive signal includes an amplitude of light dimming driving voltage. The backlight driver chip is configured to output a backlight driving signal to the backlight module to control the luminance of the backlight module. Information carried by the backlight driving signal includes an amplitude of backlight driving current and a pulse width modulation ratio of the backlight driving current. The dimming driver chip is further configured to control a time when the backlight driver chip outputs the backlight driving signal according to a preset delay time and a time when the dimming driver chip outputs the dimming driving signal.

In some embodiments, the display module has at least two different sharing states, and viewing angles for different sharing states are different. Both the backlight driver chip and the dimming driver chip store an anti-peeping mode and at least two different sharing modes. The backlight driver chip is configured to output a corresponding backlight driving signal according to a different display mode. The dimming driver chip is configured to output a corresponding dimming driving signal according to a different display mode.

In another aspect, a display device is provided. The display device includes the display module as mentioned in any one of the above embodiments.

In yet another aspect, an anti-peeping driving method is provided. The anti-peeping driving method includes: controlling a display module to switch between a sharing state and an anti-peeping state through a dimming driver chip and a backlight driver chip.

In some embodiments, controlling the display module to switch between the sharing state and the anti-peeping state through the dimming driver chip and the backlight driver chip, including: controlling the display module to switch to the anti-peeping state through the dimming driver chip and the backlight driver chip; and controlling the display module to switch to the sharing state through the dimming driver chip and the backlight driver chip.

Controlling the display module to switch to the anti-peeping state through the dimming driver chip and the backlight driver chip, including the following steps.

Outputting, by the dimming driver chip, an anti-peeping state dimming driving signal to the dimming panel to control an angle of light emitted by the dimming panel, wherein information carried by the anti-peeping state dimming driving signal includes an amplitude of anti-peeping state dimming driving voltage.

According to a time when the dimming driver chip outputs the anti-peeping state dimming driving signal, outputting, by the backlight driver chip, an anti-peeping state backlight driving signal to the backlight module after a first preset time to control a luminance of the backlight module. Information carried by the anti-peeping state backlight driving signal includes an amplitude of an anti-peeping state backlight driving current and a pulse width modulation ratio of the anti-peeping state backlight driving current.

Controlling the display module to switch to the sharing state through the dimming driver chip and the backlight driver chip, including the following steps.

Outputting, by the dimming driver chip, a sharing state dimming driving signal to the dimming panel to control the angle of the light emitted by the dimming panel, wherein information carried by the sharing state dimming driving signal includes an amplitude of a sharing state dimming driving voltage.

According to the time when the dimming driver chip outputs the sharing state dimming driving signal, outputting, by the dimming driver chip, a sharing state backlight driving signal to the backlight module after a second preset time to control the luminance of the backlight module. Information carried by the sharing state backlight driving signal includes an amplitude of a sharing state backlight driving current and a pulse width modulation ratio of the sharing state backlight driving current.

In the above, the amplitude of the anti-peeping state dimming driving voltage is greater than the amplitude of sharing state dimming driving voltage, the amplitude of the anti-peeping state backlight driving current is equal to the amplitude of the sharing state backlight driving current, and the pulse width modulation ratio of the anti-peeping state backlight driving current is less than the pulse width modulation ratio of the sharing state backlight driving current.

BRIEF DESCRIPTION OF THE DRAWINGS

In order to describe the technical solutions in the present disclosure more clearly, the accompanying drawings to be used in some embodiments of the present disclosure will be introduced briefly below. Obviously, the accompanying drawings to be described below are merely drawings of some embodiments of the present disclosure, and those of ordinary skill in the art can obtain other drawings according to these drawings. In addition, the accompanying drawings in the following description may be regarded as schematic diagrams, but are not limitations on actual sizes of products, actual processes of methods and actual timings of signals involved in the embodiments of the present disclosure.

FIG. 6 is a diagram showing a light propagation path of a display module, in accordance with some embodiments.

FIG. 7 is a structural diagram of a display module, in accordance with some embodiments.

FIG. 8 is a structural diagram of a display module, in accordance with some other embodiments.

DETAILED DESCRIPTION

Figure 1:
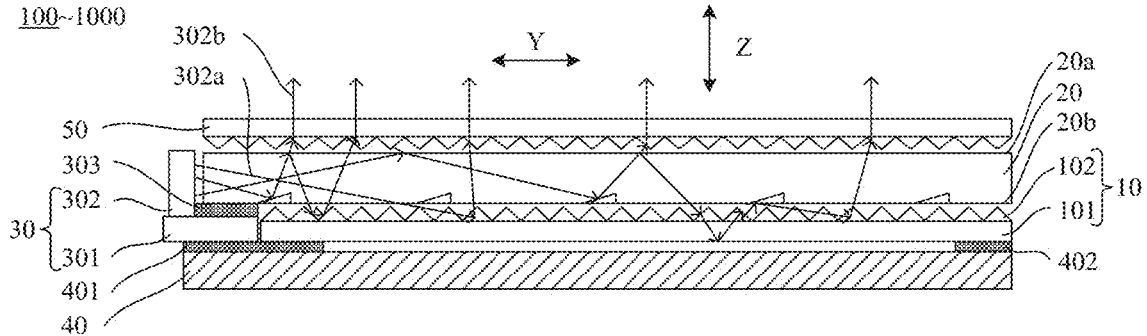
FIG. 1 is a structural diagram of a backlight module, in accordance with some embodiments.

The technical solutions in some embodiments of the present disclosure will be described clearly and completely with reference to the accompanying drawings. Obviously, the embodiments to be described are merely some but not all embodiments of the present disclosure. All other embodiments obtained by those of ordinary skill in the art based on the embodiments of the present disclosure shall fall within the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the detailed description of the specification, the terms such as "one embodiment", "some embodiments", "exemplary embodiments", "example", "specific example", or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the said specific features, structures, materials, or characteristics may be included in any one or more embodiments or examples in any suitable manner.

Hereinafter, the terms such as "first" and "second" are used for descriptive purposes only, and cannot be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

When describing some embodiments, the expressions "coupled", "connected", and derivatives thereof may be used. The term "connected" should be understood in a broad sense. For example, the term "connected" may represent a fixed connection, a detachable connection, or a one-piece connection, or may represent a direct connection, or may represent an indirect connection through an intermediate medium. The term "coupled" indicates that two or more components are in direct physical or electrical contact with each other. The term "coupled" or "communicatively coupled" may also mean that two or more components are not in direct contact with each other but still cooperate or interact with each other. The embodiments disclosed herein are not necessarily limited to the content herein.

The phrase "at least one of A, B, and C" has the same meaning as the phrase "at least one of A, B, or C", both including the following combinations of A, B, and C: only A, only B, only C, a combination of A and B, a combination of A and C, a combination of B and C, and a combination of A, B, and C.

The phrase "A and/or B" includes following three combinations: only A, only B, and a combination of A and B.

As used herein, the term "if" is, optionally, construed as "when" or "in a case where" or "in response to determining that" or "in response to detecting," depending on the context. Similarly, depending on the context, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]."

The use of the phrase "applicable to" or "configured to" herein means an open and inclusive expression, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or values exceeding those stated.

The term such as "about", "substantially", or "approximately" as used herein includes a stated value and an average value within an acceptable range of deviation of a particular value. The acceptable range of deviation may be determined, for example, by those of ordinary skill in the art, considering measurement in question and errors associated with measurement of a particular quantity (i.e., limitations of a measurement system).

The term such as "parallel", "perpendicular", or "equal" as used herein includes a stated condition and a condition similar to the stated condition. The range of the similar condition is within an acceptable range of deviation, and the acceptable range of deviation may be determined, for example, by those of ordinary skill in the art, considering measurement in question and errors associated with measurement of a particular quantity (i.e., the limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be a deviation within 5°; the term "equal" includes absolute equality and approximate equality, and an acceptable range of deviation of the approximate equality may be, for example, a difference between two equals being less than or equal to 5% of either of the two equals.

It should be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Figure 3:
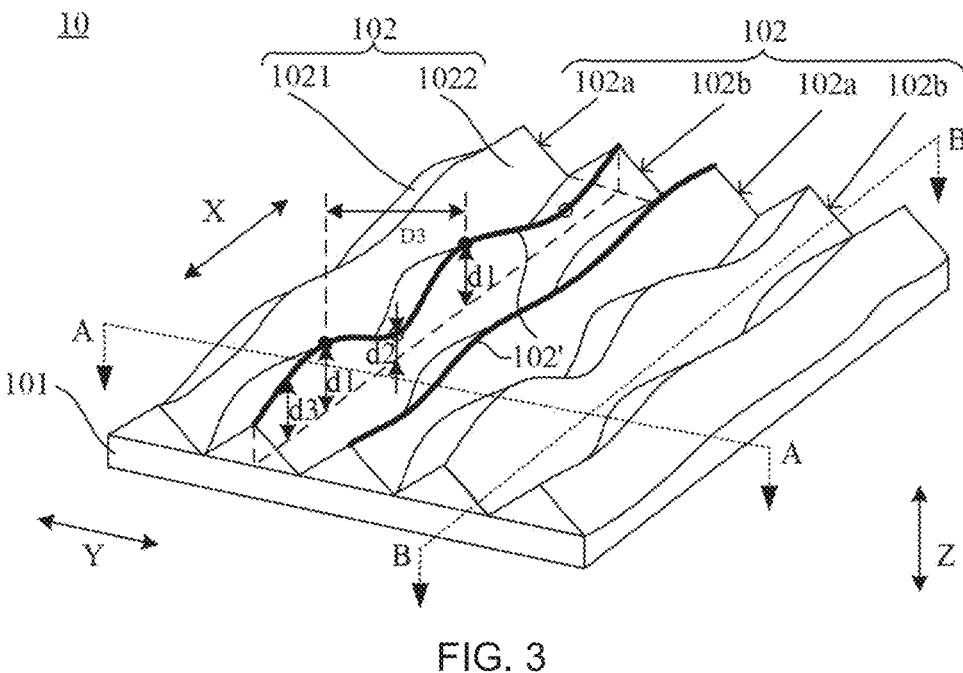
FIG. 3 is a structural diagram of a prismatic reflective film, in accordance with some embodiments.

Embodiments of the present disclosure provide a backlight module 100. As shown in FIGS. 1 and 3, the backlight module 100 includes a light guide plate 20 and a prismatic reflective film 10. The prismatic reflective film 10 is disposed on a surface of the light guide plate 20 opposite to a light exit surface of the light guide plate 20. A surface of the prismatic reflective film 10 proximate to the light guide plate 20 is provided with a plurality of protruding structures 102 thereon. The plurality of protruding structures 102 extend in a first direction X. The tops 102' of at least two protruding structures 102 of the plurality of protruding structures 102 are uneven.

As shown in FIG. 1, the light guide plate 20 includes a first surface 20a and a second surface 20b opposite to each other. The first surface 20a of the light guide plate 20 is the light exit surface of the light guide plate 20. The prismatic reflective film 10 is disposed on the second surface 20b of the light guide plate 20. The plurality of protruding structures 102 of the prismatic reflective film 10 face the second surface 20b of the light guide plate 20.

Exemplarily, the light guide plate 20 is made of transparent materials such as glass, acrylic, or polycarbonate plates. It will be understood that the light guide plate 20 may also be made of other transparent materials, which is not limited here.

In some embodiments, the backlight module includes: a light source, a light guide plate, and a reflective sheet disposed on a side of the light guide plate opposite to a light exit surface of the light guide plate. The light guide plate and the reflective sheet are used to distribute the light emitted by the light source and extract the light at a corresponding position (i.e., the light exit surface of the light guide plate) to provide backlight for the display panel in the display module.

In some examples, the reflective sheet is a silver reflective sheet. Exemplarily, the light guide plate may expand or contract due to the influence of environmental factors such as temperature and humidity. During the expansion or contraction process of the light guide plate, relative movement between the light guide plate and the silver reflective sheet may easily occur. Since the hardness of the silver reflective sheet is greater than the hardness of the light guide plate, when there is relative movement between the light guide plate and the silver reflective sheet, a surface of the light guide plate proximate to the silver reflective sheet may be scratched by the silver reflective sheet, which may affect the light distribution effect of the light guide plate, and thereby affect the quality of light extraction of the backlight module.

In some other embodiments, as shown in FIG. 1, the reflective sheet is a prismatic reflective film 10.

Exemplarily, the material of the prismatic reflective film 10 includes but is not limited to soft resin.

The hardness of the prismatic reflective film 10 is less than that of the light guide plate 20. In this way, during the expansion or contraction process of the light guide plate 20, the light guide plate 20 will not be scratched due to the relative movement between the light guide plate 20 and the prismatic reflective film 10. Thus, the light distribution effect of the light guide plate 20 is ensured, thereby ensuring the quality of light extraction of the backlight module.

In some embodiments, as shown in FIG. 3, the prismatic reflective film 10 includes a base film 101 and a plurality of protruding structures 102 disposed on a side of the base film 101. The plurality of protruding structures 102 included in the prismatic reflective film 10 extend in the first direction X and are sequentially arranged in a second direction Y. A third direction Z is perpendicular to both the first direction X and the second direction Y.

Figure 2:
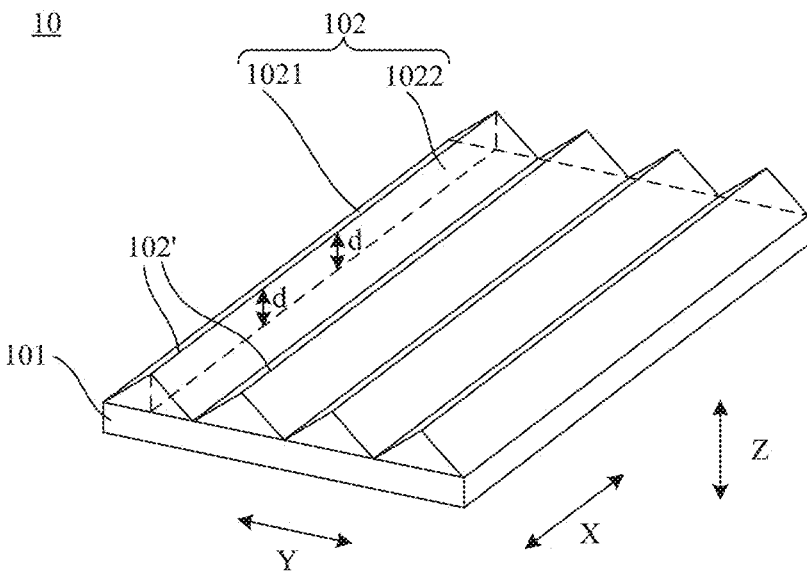
FIG. 2 is a structural diagram of a prism sheet, in accordance with some examples.

As shown in FIG. 2, in a conventional prism sheet, the top 102' of each protruding structure 102 is even, that is to say, the protruding structure 102 has a same height in an extending direction thereof, i.e., the first direction X, at every position; for example, the height is d at every position.

Referring to FIG. 3, in order to clearly illustrate the tops of the protruding structures 102, the tops 102' of two of the protruding structures 102 are marked thickened. As shown in FIG. 3, in some embodiments provided by the present disclosure, the tops 102' of at least two of the plurality of protruding structures 102 are not even, which means that in the extending direction of the protruding structure 102, the top of the protruding structure 102 has different heights at different positions. For example, FIG. 3 illustrates the heights of the top of the protruding structure 102 at four different positions, which are d3, d1, d2, and d1 respectively. The height of the top of the protruding structure 102 at a certain position refers to a distance between the position and the base film 101 in the third direction Z. The plurality of protruding structures 102 on the surface of the prismatic reflective film 10 proximate to the light guide plate 20 face the light guide plate 20, which may be understood that in a case where a surface of the light guide plate 20 proximate to the prismatic reflective film 10 is in contact with the prismatic reflective film 10, the portions of each protruding structure 102 that are in contact with the light guide plate 20 are discontinuous.

Compared with the design in which the top of the protruding structure 102 has an equal height in the third direction Z at every position as shown in FIG. 2, the embodiments of the present disclosure adopt the design of unequal heights of the protruding structure 102 as shown in FIG. 3, which reduces an contact area between the prismatic reflective film 10 and the light guide plate 20, and further reduces the possibility of surface damage caused by contact and/or relative movement between the surface of the light guide plate 20 facing the prismatic reflective film 10 (e.g., the second surface 20b of the light guide plate 20 shown in FIG. 1) and the prismatic reflective film 10.

Meanwhile, compared with using a silver reflective sheet, using the prismatic reflective film has a lower manufacturing cost, and the prismatic reflective film has a smaller thickness, thereby reducing the cost and thickness of the backlight module 100. The thickness of the backlight module 100 refers to the thickness of the backlight module 100 in the third direction Z as shown in FIG. 1.

Since the tops of the plurality of protruding structures 102 are uneven, as the distance between the prismatic reflective film 10 and the light guide plate 20 gradually decreases, the light guide plate 20 is in contact with a portion of the top of the protruding structure 102 firstly, and as the distance between the prismatic reflective film 10 and the light guide plate 20 continually decreases, the contact area between the top of the protruding structure 102 and the light guide plate 20 gradually increases.

For example, the heights d1, d2 and d3 shown in FIG. 3 satisfy d1>d3>d2. For example, the light guide plate 20 is in contact with the part of the prismatic reflective film 10 whose height is greater than or equal to d1, and is not in contact with the part of the prismatic reflective film 10 whose height is less than d1. The distance between the prismatic reflective film 10 and the light guide plate 20 gradually decreases due to the expansion in volume of the light guide plate 20 when heated or external forces. In this case, as the distance between the two decreases, firstly, the light guide plate 20 is in contact with the part of the prismatic reflective film 10 whose height is greater than or equal to d3, and is not in contact with the part of the prismatic reflective film 10 whose height is less than d3; then, the light guide plate 20 is in contact with the part of the prismatic reflective film 10 whose height is greater than or equal to d2, and is not in contact with the part of the prismatic reflective film 10 whose height is less than d2. It will be understood that in the process of the distance between the prismatic reflective film 10 and the light guide plate 20 decreasing, the contact area between the prismatic reflective film 10 and the light guide plate 20 gradually increases, which achieves multiple buffering effects.

Figure 4:
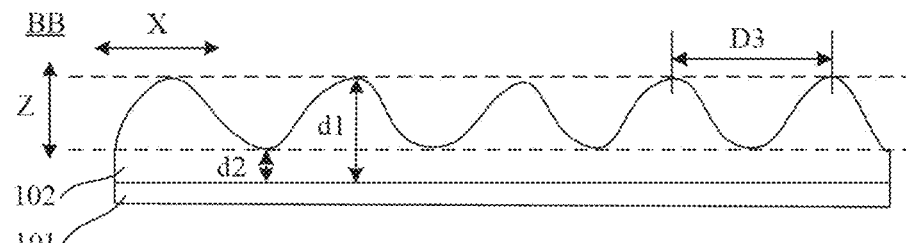
FIG. 4 is a first sectional view taken along the section line BB in FIG. 3.

Exemplarily, as shown in FIG. 3, the prismatic reflective film 10 includes a base film 101 and a plurality of protruding structures 102 provided on a side of the base film 101. In a first sectional view obtained by taking a cross-section perpendicular to the base film 101 and parallel to the first direction X and passing through the top of the protruding structure 102, i.e., in the first sectional view taken along the section line BB, the top of the protruding structure 102 is wavy. Referring to FIGS. 3 and 4, in the first sectional view shown in FIG. 4 taken along the section line BB, the top of the protruding structure 102 is curved and wavy and has an undulating shape.

It will be understood that by adopting a wavy design for the sectional shape of the protruding structure 102, the protruding structure 102 has different heights in the third direction Z perpendicular to the base film 101 at different positions, that is, in the prismatic reflective film 10 provided by some embodiments of the present disclosure, unequal height design in the third direction Z is adopted. Thus, in a case where the prismatic reflective film 10 is in contact with the light guide plate 20, for the plurality of protruding structures 102 of the prismatic reflective film 10, a position with a highest height in the third direction Z is firstly in contact with the light guide plate 20, and other positions are not in contact with the light guide plate 20. Compared with a reflective sheet adopting a planar structure or a prismatic reflective film adopting an equal height design in the third direction Z, the contact area between the prismatic reflective film 10 and the light guide plate 20 is smaller, which may effectively avoid the problem that the surface of the light guide plate 20 is scratched due to the relative movement between the light guide plate 20 and the prismatic reflective film 10.

Exemplarily, as shown in FIGS. 3 and 4, in the first sectional view, the top of the protruding structure 102 has a highest position and a lowest position, and a distance d1 between the highest position and the base film 101 is in a range from 5 μm to 50 μm, inclusive. As shown in FIG. 3, the highest position is the position marked by a solid circle, and the lowest position is the position marked by a hollow circle.

In some embodiments, the distance d1 between the highest position of the top of the protruding structure 102 and the base film 101 may be, for example, 5 μm, 35 μm, or 50 μm.

By limiting the distance between the highest position on the top of the protruding structure 102 and the base film 101, the unevenness of the surface of prismatic reflective film 10 facing to the light guide plate 20 is ensured, which avoids the problem that the contact area between the prismatic reflective film 10 and the light guide plate 20 cannot reduced caused by the surface of the prismatic reflective film 10 provided with the plurality of protruding structures 102 being of an approximate planar structure due to a case that the heights of the plurality of protruding structures 102 in the third direction Z are too small.

Exemplarily, as shown in FIG. 4, in the first sectional view, a difference between the distance d1 between the highest position and the base film 101 and the distance d2 between the lowest position and the base film 101 is less than half of the distance d1 between the highest position and the base film 101.

By limiting the difference between the distance d1 between the highest position and the base film 101 and the distance d2 between the lowest position and the base film 101, the unevenness of the surface of the prismatic reflective film 10 facing to the light guide plate 20 is further ensured, so that the surface of the prismatic reflective film 10 facing to the light guide plate 20 is uneven. As a result, the contact area between the prismatic reflective film 10 and the light guide plate 20 is reduced.

Exemplarily, as shown in FIG. 4, in the first sectional view, the distance between the top of the protruding structure 102 and the base film 101 changes cyclically, and the top of the protruding structure 102 has at least two highest positions and at least two lowest positions that are arranged alternately.

By adopting a cyclically changing design for the distance between the top of the protruding structure 102 and the base film 101 in the extending direction of the protruding structure 102, i.e., the first direction X shown in FIG. 3, the shape of the protruding structure cyclically changes in the first direction X. For example, the cycle of changing in the distance is greater than 80 μm. As shown in FIGS. 3 and 4, in some examples, the distance D3 between two adjacent highest positions is greater than 80 μm. Similarly, the distance between two adjacent lowest positions is greater than 80 μm.

The highest positions and the lowest positions on the top of the protruding structure 102 are alternately arranged. Thus, in a case where the prismatic reflective film 10 is in contact with the light guide plate 20, the highest positions on the top of the protruding structure 102 are in contact with the light guide plate 20, and the lowest positions on the top of the protruding structure 102 are not in contact with the light guide plate 20. It will be understood that the contact positions between the prismatic reflective film 10 and the light guide plate 20 are discontinuous, so that the multiple contact positions between the prismatic reflective film 10 and the light guide plate 20 are ensured to be separated from each other, and the contact area between the prismatic reflective film 10 and the light guide plate 20 is further reduced.

In a case where there are great number of contact positions between the prismatic reflective film 10 and the light guide plate 20, the contact area of each contact position is small. In this way, in a case where the prismatic reflective film 10 causes damage to the surface of the light guide plate 20, the area of damage to the surface of the light guide plate 20 is small due to the small area of each contact position, and the human eyes cannot recognize these tiny damages. Therefore, even if the surface of the light guide plate 20 is damaged, the light output effect of the backlight module will not be affected.

By limiting the distance D3 between two adjacent highest positions of the protruding structure 102, it is ensured that the contact positions between each protruding structure 102 and the light guide plate 20 are spaced apart. It will be understood that, in the extending direction of the protruding structure 102, i.e., in the first direction X, if the distance D3 between two adjacent highest positions is too small, the multiple contact positions between the protruding structure 102 and the light guide plate 20 are too close to each other, which makes the multiple contact positions joined together (approximately a line), and is not conducive to reducing the contact area between the prismatic reflective film 10 and the light guide plate 20.

In some embodiments, the distance D3 between two adjacent highest positions may be, for example, 80 μm, 100 μm, or 120 μm.

Figure 5:
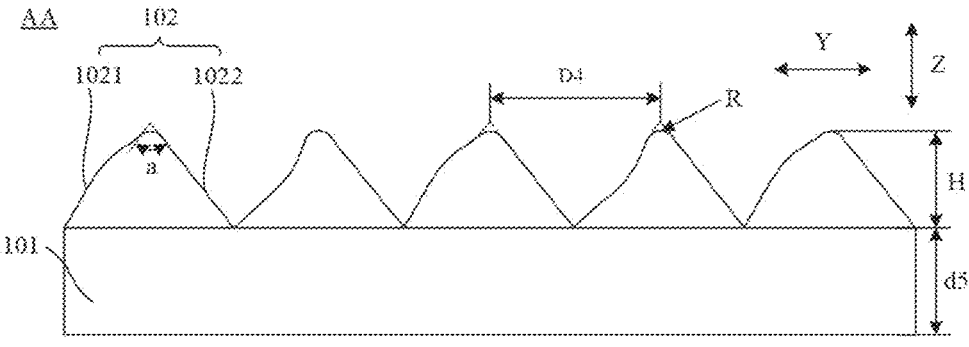
FIG. 5 is a second sectional view taken along the section line AA in FIG. 3.

Exemplarily, as shown in FIGS. 3 and 5, the plurality of protruding structures 102 are arranged in the second direction Y In a second sectional view obtained by taking a cross-section perpendicular to the base film 101 and parallel to the second direction Y, the distance D4 between the tops of two adjacent protruding structures 102 is in a range from 10 μm to 150 μm, inclusive. Referring to FIG. 3 and FIG. 5, the second sectional view as shown in FIG. 5 is taken along the section line AA.

In some embodiments, the first direction X and the second direction Y are perpendicular to each other. The plurality of protruding structures 102 are sequentially arranged in the second direction Y, and each protruding structure 102 includes a plurality of alternately arranged highest positions and lowest positions in the first direction X in the first sectional view, so that the contact surface between the prismatic reflective film 10 and the light guide plate 20 may be regarded as consisting of a plurality of contact points arranged in an array. By reducing the contact area between the prismatic reflective film 10 and the light guide plate 20 and increasing the number of contact positions (contact points), the influence of damage to the surface of the light guide plate 20 on the light output effect of the backlight module 100 may be effectively avoided.

In some embodiments, the distance D4 between two adjacent protruding structures 102 may be, for example, 10 μm, 100 μm, or 150 μm.

Exemplarily, as shown in FIGS. 3 and 5, the protruding structure 102 includes a first surface 1021 and a second surface 1022 that intersect, and the position where the first surface 1021 and the second surface 1022 intersect is the top 102' of the protruding structure 102. At least one of the first surface 1021 and the second surface 1022 is a wavy curved surface.

As shown in FIG. 3, the first surface 1021 of the protruding structure 102 is a wavy curved surface, and the second surface 1022 of the protruding structure 102 is a flat surface. Adopting such the design facilitates the manufacturing process of the protruding structures 102. For example, when processing, multiple initial protruding structures are first formed on a side of the base film 101, and a first surface and a second surface of each initial protruding structure are both flat; then, the first surface of the initial protruding structure is processed, and after a part is cut off, a protruding structure with a wavy curved surface is formed. In this way, while the first surface of the initial protruding structure is processed, the top of the protruding structure 102 with an undulating shape in the first direction X is formed; that is, in the aforementioned first sectional view, the protruding structure 102 includes multiple alternately arranged highest positions and lowest positions.

Exemplarily, as shown in FIG. 5, in the second sectional view, an angle a formed by the first surface 1021 and the second surface 1022 of the protruding structure 102 is in a range from 50° to 150°, inclusive.

In some embodiments, in the second sectional view, the angle a formed by the first surface 1021 and the second surface 1022 of the protruding structure 102 may be, for example, 50°, 100°, or 150°.

In some other embodiments, in the second sectional view, the angle a formed by the first surface 1021 and the second surface 1022 of the protruding structure 102 is in a range from 80° to 100°, inclusive.

Exemplarily, as shown in FIG. 5, in the second sectional view, the top of the protruding structure 102 has a rounded corner R.

In some embodiments, a radius of the rounded corner R of the top of the protruding structure 102 is in a range from 1 μm to 10 μm, inclusive. The radius of the rounded corner R of the top of the protruding structure 102 may be, for example, 1 μm, 5 μm, or 10 μm.

Exemplarily, as shown in FIG. 5, the base film 101 is a soft resin base, and a thickness d5 of the base film is in a range from 30 μm to 200 μm, inclusive. The thickness d5 of the base film 101 may be, for example, 30 μm, 100 μm, or 200 μm.

Further, the thickness d5 of the base film 101 is in a range from 50 μm to 125 μm, inclusive. The thickness d5 of the base film 101 may be, for example, 50 μm, 80 μm, or 125 μm.

The soft resin base is used as the base film 101 of the prismatic reflective film 10, and the hardness of the soft resin base is less than the hardness of the light guide plate 20. Thus, under reliability conditions, the light guide plate 20 will not be scratched even if there exists relative movement between the light guide plate 20 and the prismatic reflective film 10, and the reliability is good.

Exemplarily, as shown in FIG. 3, the plurality of protruding structures 102 include a plurality of first protruding structures 102a and a plurality of second protruding structures 102b. The shapes of the first protruding structure 102a and the second protruding structure 102b are different. The plurality of first protruding structures 102a and the plurality of second protruding structures 102b are alternately arranged in the second direction Y.

In some embodiments, as shown in FIG. 3, the highest position of the first protruding structure 102a in a third sectional view obtained by taking a cross-section perpendicular to the base film 101 and parallel to the first direction X and passing through the top of the first protruding structure 102a, corresponds to, the lowest position of the second protruding structure 102b in a fourth sectional view obtained by taking a cross-section perpendicular to the base film 101 and parallel to the first direction X and passing through the top of the second protruding structure 102b, in the second direction Y. With such the design, multiple contact positions between the prismatic reflective film 10 and the light guide plate 20 are further spaced apart to prevent two adjacent contact positions from being joined together.

The roughness of a surface of an object refers to the waviness of tiny peaks and valleys and small spacings on the surface, i.e., a distance (wave distance) between two wave peaks or two wave valleys. The smaller the surface roughness of an object, the smoother the surface of the object. For example, the surface roughness of an object is 1 μm, which means that among the multiple small spacings and tiny peaks and valleys on the surface, the distance between two adjacent peaks or valleys is 1 μm.

The rougher the surface of an object, the higher the surface roughness of surface of the object, and when light irradiates the surface, diffuse reflection occurs, that is, the parallel incident light rays are emitted divergently. The smoother the surface of the object, the lower the surface roughness of the surface of the object, and when light is irradiated on the surface, specular reflection occurs, that is, parallel incident light rays are also emitted in parallel. In a case where the same light is irradiated on surfaces with different surface roughness, the reflection effect of the light is not the same. The lower the surface roughness, the more concentrated the reflected light. It can be seen that, compared with a case that the light is irradiated on a surface with a higher surface roughness, for another case that the same light is irradiated on a surface with a lower surface roughness, the reflected light is brighter. It will be understood that the lower the surface roughness of the prismatic reflective film 10, the better the light reflection effect and the higher the light utilization rate.

One of the functions of the prismatic reflective film 10 is to concentrate the light entering the prismatic reflective film 10 and emit it from the surface where the plurality of protruding structures 102 are provided. It will be understood that the lower the surface roughness of the prismatic reflective film 10, the higher the light utilization rate, and the better the light reflection effect.

Exemplarily, the surface roughness of at least another surface of the base film 101 opposite to the surface where the plurality of protruding structures 102 are provided is equal to or less than 0.33 μm. The surface roughness of at least the another surface of the base film 101 opposite to the surface where the plurality of protruding structures 102 are provided may be, for example, 0.1 μm, 0.2 μm, or 0.33 μm.

Further, the surface roughness of other surfaces of the base film 101 except for the surface where the plurality of protruding structures 102 are provided is equal to or less than 0.33 μm. The surface roughness of other surfaces of the base film 101 except for the surface where the plurality of protruding structures 102 are provided may be, for example, 0.1 μm, 0.2 μm, or 0.33 μm.

Exemplarily, as shown in FIG. 1, the backlight module 100 further includes a backplate 40 provided on a side of the prismatic reflective film 10 away from the light guide plate 20. The surface of the backplate 40 is provided with a light-absorbing coating thereon.

The main function of the backplate 40 is to carry devices such as the light guide plate 20 located thereon. In order to make the backplate 40 have good load-bearing capacity, in some embodiments, the backplate 40 is a metal backplate, which has good load-bearing capacity.

The prismatic reflective film 10 has good light transmittance. Therefore, if the backlight module 100 only adopts a combination of the prismatic reflective film 10, the light guide plate 20 and the backplate, the light output effect of the backlight module 100 will be affected. For example, defects such as machining pattern or scratches on the surface of the backplate can be seen in the backlight module. In order to solve the aforementioned problem, some examples of the related art adopt a method of attaching a black polyethylene terephthalate (PET) film to the surface of the backplate. However, attaching the black PET film will not only increase the thickness of the backlight module, but also improve the manufacturing cost and make the manufacturing process complex. Moreover, PET material is prone to wrinkle defects in high temperature and high humidity, which affects the light output effect of the backlight module, resulting in abnormal image display of the display module using the backlight module.

The light-absorbing coating on the surface of the backplate 40 may be made of dark color paint to cover the surface of the backplate 40 to prevent users from seeing the metallic color of the backplate 40 and the defects such as machining pattern or scratches on the surface of the backplate 40 through the prismatic reflective film 10, thereby improving the viewing effect.

In some embodiments, the light-absorbing coating on the surface of the backplate 40 is formed by using a coating process, such as a paint baking process. Further, the light-absorbing coating on the surface of the backplate 40 is black baking paint. The light-absorbing coating formed in this way is thinner than the attached black PET film. The thickness of the light-absorbing coating is almost negligible compared with the black PET film, which reduces the thickness of the backlight module 100 and facilitates the lightness and thinness of the product. Moreover, there is no need to attach a PET film, which reduces the difficulty of the manufacturing process of the backlight module and saves manufacturing costs.

During the manufacturing process, the thickness of the light-absorbing coating formed by the coating process may reach the micron level, specifically less than or equal to 0.07 microns. It can be seen that, compared with the attached black PET film with the thickness of 0.05 millimeters, the light-absorbing coating in the embodiments of the present disclosure has a significant smaller thickness, which may reach a negligible level. Therefore, the thickness of the backlight module may be significantly reduced, which facilitates the lightness and thinness of the products and improves user experience.

In some embodiments of the present disclosure, the light-absorbing coating is disposed on the surface of the backplate 40 and is cooperated with the prismatic reflective film 10 and the light guide plate 20. Thus, the assembly process of the backlight module 100 is simple and efficient while the thickness of the backlight module 100 is reduced, which may ensure product stability.

Exemplarily, as shown in FIG. 1, the backlight module 100 further includes a light source 30. The light source 30 includes a base plate 301 and a light-emitting device 302 provided on the base plate 301. The light-emitting device 302 is disposed at an end of the light guide plate 20. The base plate 301 is disposed on a surface (i.e., the second surface 20b of the light guide plate 20) of the light guide plate 20 opposite to the light exit surface (i.e., the first surface 20a of the light guide plate 20) of the light guide plate 20, and is disposed at an end of the prismatic reflective film 10. The overlapping portions of the base plate 301 and the light guide plate 20 are connected by a first adhesive layer 303. A second adhesive layer 401 is provided on at least a position where a surface of the base plate 301 away from the light guide plate 20 and a surface of the prismatic reflective film 10 away from the light guide plate 20 are close to each other.

In some embodiments, the light-emitting device 302 is a light-emitting diode (LED) light bar or a strip-shaped light bar composed of multiple LED beads arranged side by side.

The light guide plate 20 is of a transparent structure and has a large refractive index. The light emitted by the light source 30 may be incident from the light incidence surface of the light guide plate 20, and totally reflected inside the light guide plate 20, and then exit from the light exit surface of the light guide plate 20. In this way, the direction of the light emitted by the light source 30 is changed, and the edge-type backlight function is achieved.

In some examples, the display module includes a display area and multiple peripheral areas surrounding the display area. Among the multiple peripheral areas, the width of the peripheral area where the light source is located is greater than the width of each of other peripheral areas, and the backlight emitted by the backlight module is directed to the display module. On another side opposite to a side of the light guide plate 20 where the light source 30 is disposed, the light source 30, the light guide plate 20 and the prismatic reflective film 10 are separately connected and fixed by tapes. The light guide plate may expand or contract due to the influence of environmental factors such as temperature and humidity. During the expansion or contraction of the light guide plate, since the prismatic reflective film 10 and the light guide plate 20 are fixed separately, relative movement between the light guide plate 20 and the prismatic reflective film 10 is easy to occur. Thus, the surface of the light guide plate 20 proximate to the prismatic reflective film 10 has the risk of being scratched. Since the prismatic reflective film 10 is transparent, if using tapes to fix the prismatic reflective film 10 on the other side opposite to the side of the light guide plate 20 where the light source 30 is disposed, the tape will be exposed in the display area of the display module due to the narrow width of the peripheral area at this position, which affects the display effect of the display module.

In some other embodiments, the light source 30, the light guide plate 20 and the prismatic reflective film 10 are connected and fixed from the side of the light guide plate 20 where the light source 30 is located, thereby preventing relative movement between the light guide plate 20 and the prismatic reflective film 10, and further preventing the surface of the light guide plate 20 from being scratched. Moreover, the light guide plate 20 is connected to the prismatic reflective film 10 at the side where the light source 30 is located, and the width of the peripheral area has a great width at the side where the light source 30 is located. In this way, the first adhesive layer 303 for connecting the light source 30, the light guide plate 20 and the prismatic reflective film 10 will not be exposed in the display area. Furthermore, since the backplate 40 is opaque, the second adhesive layer 401 will not be exposed in the display area.

In some embodiments, the base plate 301 is, for example, a flexible printed circuit board (FPC). The light-emitting device 302 is electrically connected to the flexible printed circuit board.

In some embodiments, only the first adhesive layer 303 is provided, and the first adhesive layer 303 is used to connect the base plate 301 and the light guide plate 20 to prevent relative movement between the two. Further, by providing a third adhesive layer 402, the base plate 301, the prismatic reflective film 10 and the backplate 40 are connected. Further, the third adhesive layer 402 is an annular adhesive arranged along the edge of the surface of the backplate 40 proximate to the prismatic reflective film 10. Due to the provision of the first adhesive layer 303, the relative movement between the base plate 301 and the light guide plate 20 is restricted, that is, the relative movement between the light source 30 and the light guide plate 20 is restricted; due to the provision of the third adhesive layer 402, the relative movement between the prismatic reflective film 10 and the backplate 40 and the relative movement between the prismatic reflective film 10 and the base plate 301 are restricted. It can be understood that with such the design, the relative movement between the prismatic reflective film 10 and the light guide plate 20 is restricted, so as to avoid defects caused by scratches on the surface of the light guide plate 20 due to the relative movement between the two.

In some other embodiments, the first adhesive layer 303 and the second adhesive layer 401 are both provided. The first adhesive layer 303 is used to connect the base plate 301 and the light guide plate 20 to prevent relative movement between the two. The second adhesive layer 401 is used to connect the base plate 301, the prismatic reflective film 10 and the backplate 40. The base plate 301, the prismatic reflective film 10 and the light guide plate 20 are fixed and connected through the first adhesive layer 303 and the second adhesive layer 401, so that there will be no relative movement between the light guide plate 20 and the prismatic reflective film 10 during the expansion process of the light guide plate 20 due to the influence of temperature, humidity and the like. As a result, it is possible to effectively prevent the surface of the light guide plate 20 from being scratched caused by the relative movement between the prismatic reflective film 10 and the light guide plate 20.

In some embodiments, as shown in FIG. 1, the backlight module 100 further includes a light conversion layer 50 disposed on a side of the light guide plate 20 away from the backplate 40.

The light conversion layer 50 may adjust the angle of the light extracted from the light exit surface of the light guide plate 20, so that the light is allowed to propagate as much as possible at an angle perpendicular to the light exit surface and prevented from propagating in other directions. Thus, the light utilization efficiency is improved, and the energy consumption of the light source 30 is reduced, thereby saving energy costs. In practical applications, the light conversion layer 50 may adopt an inverse prism. It can be understood that the light conversion layer 50 may also use other structures with the same characteristics, which is not limited here.

Some embodiments of the present disclosure provide a display module 200, as shown in FIG. 6, the display module 200 includes the backlight module 100 as provided in any of the above embodiments, a dimming structure 60, and a display panel 70. In the backlight module 100, as shown in FIG. 1, the light guide plate 20 is a collimating light guide plate, and the light guide plate 20 is configured to emit the light 302*a* entering the interior of the light guide plate 20 perpendicularly from the light exit surface (for example, the light is converted into the light 302*b* perpendicularly emitted from the first surface 20*a* of the light guide plate 20 as shown in FIG. 1). The dimming structure 60 is disposed on a light exit surface of the backlight module 100. The dimming structure 60 is used to adjust the angle of light emitted from the light exit surface of the light guide plate 20. The display panel 70 is disposed on a side of the dimming structure 60 away from the backlight module 100, and the display panel 70 is used to perform display by using the light passing through the dimming structure 60.

The light 302*b* of backlight provided by the backlight module 100 is perpendicularly or substantially perpendicularly emitted toward the display panel 70. The light 302*b* of backlight provided by the backlight module 100 is first emitted toward the dimming structure 60. After passing through the dimming structure 60, the light 302*b* is emitted toward the display panel 70 to serve as the backlight source for the display panel 70 to display images.

In an anti-peeping display state, the angle of the light passing through the dimming structure 60 may be adjusted by adjusting the voltage input to the dimming structure 60, so that the light is allowed to irradiate the display panel 70 at an angle of nearly 90 degrees, so that the viewing angle of the display panel 70 is within a small range and the display panel 70 may be viewed only by the user to achieve anti-peeping display. In a normal display state, the light angle of the dimming structure 60 may be adjusted by adjusting the voltage input to the dimming structure 60, so that the light is allowed to irradiate the display panel 70 at a large angle, so that the viewing angle of the display panel 70 is within a large range to allow multiple people to watch together from different angles to achieve normal display.

Exemplarily, as shown in FIGS. 7 and 8, the display panel 70 includes a first polarizer 701, a display liquid crystal panel 702 and a second polarizer 703 that are stacked in sequence. The first polarizer 701 is closer to the backlight module 100 than the second polarizer 703. The dimming structure 60 includes a dimming panel 602 and a dimming film 601. The dimming film 601 is disposed on a side of the dimming panel 602 away from the display panel 70.

After being extracted from the light guide plate 20, the light passes through the dimming structure 60, and then passes through the first polarizer 701 and is converted into linearly polarized light deflected in one direction due to the action of the first polarizer 701. The display liquid crystal panel 702 is provided with a pixel driving circuit on a side proximate to the first polarizer 701. A driving voltage may be applied to the pixel driving circuit, and the liquid crystal molecules in the display liquid crystal panel 702 are deflected in a certain direction under the control of the driving voltage. In this case, the linearly polarized light deflected in one direction may pass through the liquid crystal molecules in the display liquid crystal panel 702 and be incident on the second polarizer 703. Due to the characteristics of liquid crystal molecules, the angle of linearly polarized light may be changed. Generally, the polarization direction of the first polarizer 701 is perpendicular to the polarization direction of the second polarizer 703. In this case, the light may pass through the second polarizer 703. In this way, the deflection angle of the liquid crystal molecules may be adjusted to adjust the transmittance of light in each pixel, thereby displaying different gray scales to form a display image.

The dimming structure 60 is used to change the angle of light emitted toward the display panel to achieve anti-peeping and sharing by collimating or scattering the light.

The dimming film 601 in the dimming structure 60 may be provided or not provided as needed. The shape of the dimming film 601 is, for example, a quadrilateral.

In some embodiments, the dimming film 601 is a two-sided privacy film, and is able to converge and collimate the light emitted from the dimming film 601 on two opposite edges, thereby achieving anti-peeping on the two opposite edges where the light is converged.

In some other embodiments, the dimming film 601 is a four-sided privacy film, and is able to converge and collimate the light emitted from the dimming film 601 on four edges of the dimming film 601, thereby achieving anti-peeping on four sides.

As a possible design, in a case where the dimming structure 60 does not include the dimming film 601, the light of backlight provided by the backlight module 100 first passes through the dimming panel 602, and the liquid crystal molecules in the liquid crystal layer of the dimming panel 602 may change the deflection angle due to the action of electric field to adjust the angle of the light passing through the dimming panel 602. The display panel 70 may display images by using the light passing through the dimming panel 602.

In the anti-peeping display state, the angle of the light passing through the dimming panel 602 may be adjusted by adjusting the voltage input to the dimming panel 602, so that the light is allowed to irradiate the display panel 70 at an angle of nearly 90 degrees, so that the viewing angle of the display panel 70 is within a small range and the display panel 70 may be viewed only by the user to achieve anti-peeping display. In the normal display state, the light angle of the dimming panel 602 may be adjusted by adjusting the voltage input to the dimming panel 602, so that the light is allowed to irradiate the display panel 70 at a large angle, so that the viewing angle of the display panel 70 is within a large range to allow multiple people to watch together from different angles to achieve normal display.

In the backlight module 100 of the display device provided by the embodiments of the present disclosure, the prismatic reflective film 10 is used to replace the original silver reflective sheet. The prismatic reflective film 10 may be made of soft resin prisms, and the hardness thereof is less than the hardness of the light guide plate 20. In this way, under reliability conditions, the light guide plate 20 will not be scratched due to the relative movement between the light guide plate 20 and the prismatic reflection film 10, so the reliability may be improved. Furthermore, the light-absorbing coating may be formed on the bottom of the backplate 40 by using a coating process. In this way, the thickness of the light-absorbing coating is small and may be almost negligible. Therefore, there is no need to apply a black protective film, so that the thickness of the backlight module may be reduced, which facilitates the lightness and thinness of the product. Moreover, it is possible to reduce the difficulty of the manufacturing process and save the manufacturing costs. In practical applications, in addition to the above settings, in order to reduce the overall thickness of the display device, the thickness of the light guide plate 20 and the backplate 40 may also be further reduced to ensure the display effect while the requirements for thinness and lightness of the display products is met.

By providing the collimating light guide plate, the light emitted by the backlight module 100 may be collimated. That is, the backlight directly provided by the backlight module 100 for the display panel is perpendicular, or substantially perpendicular to the display panel 70. It will be understood that, in this way, the display image of the display panel 70 (that is, the display image of the display module 200) may only be seen when directly facing the display panel 70, the display image of the display module 200 cannot be seen or cannot be clearly seen from other directions, thereby achieving the anti-peeping effect. By providing the dimming panel 602, when the dimming panel 602 is working, the collimated backlight emitted by the backlight module 100 may be scattered, so that the light emitted toward the display panel 70 changes from the light perpendicular to the display panel 70 to scattered light, thereby increasing the viewing angle of the display module 200. As a result, the display image of the display module 200 may be seen not only from a side directly facing the light exit side of the display module 200, but also from the up, down, left and right side of the display module 200. By controlling the dimming panel 602, the light emitted from the backlight module 100 may be scattered to different degrees, so that the display module 200 is allowed to have different viewing angles. In this way, it is possible to achieve the switching between an anti-peeping state and a sharing state of the display module 200.

In some examples, in order to prevent the dimming panel 602 from adhering to the first polarizer 701 in the display panel 70, there is a need to have a gap between the dimming panel 602 and the display panel 70. However, the existence of the gap between the dimming panel 602 and the display panel 70 not only increases the thickness of the backlight module 100, but also has high requirements on the reliability edge failure value of the dimming panel 602. Exemplarily, the thicknesses of the dimming panel 602 and the dimming film 601 in the dimming structure 60 may be, for example, 0.3 mm and 0.25 mm, respectively, and a gap of 0.4 mm to 0.5 mm is required between the dimming panel 602 and the display panel 70. If the size of the gap is greater than the thicknesses of the dimming panel 602 and the dimming film 601, which is not conducive to the design of the thinness and lightness of the backlight module 100. Moreover, the edges of the dimming panel 602 and the dimming film 601 are easily warped, resulting in defects.

In some other embodiments, as shown in FIG. 7, the dimming panel 602 and the first polarizer 701 are combined into a one-piece structure. With such the design, the gap between the dimming panel 602 and the first polarizer 701 is reduced, the thickness of the dimming panel 602 may also be reduced, and the dimming structure 60 and the display panel 70 are close to each other, so that the anti-peeping performance of the display module 200 is good.

Exemplarily, in a case where the backlight module 100 adopting the above-mentioned structure is applied to the display module 200, the anti-peeping viewing angle of the display module 200 is, for example, 0.5%@45°. The thickness of the dimming panel 602 is, for example, 0.125 mm. The gap between the dimming panel 602 and the first polarizer 701 is, for example, 0.05 mm. The thickness of the display module 200 is, for example, 0.525 mm. In this way, the overall thickness of the display module 200 is reduced while the anti-peeping performance of the display module 200 is improved.

As shown in FIGS. 7 and 8, the display liquid crystal panel 702 includes a first substrate 702a and a second substrate 702b. The first substrate 702a is closer to the backlight module 100 than the second substrate 702b. The first substrate 702a is, for example, an array substrate, and the second substrate 702b is, for example, an opposite substrate.

By adopting a design in which the dimming panel 602 and the first polarizer 701 are combined into a one-piece structure, the first polarizer 701 and the dimming panel 602 are attached to the first substrate 702a and supported by the first substrate 702a, which greatly improves reliability.

In some other embodiments, as shown in FIG. 8, the dimming film 601, the dimming panel 602 and the first polarizer 701 are combined into a one-piece structure. By adopting a design in which the dimming film 601, the dimming panel 602 and the first polarizer 701 are combined into a one-piece structure, the gap between the dimming panel 602 and the first polarizer 701 is reduced, the thickness of the dimming panel 602 may also be reduced, and the dimming structure 60 and the display panel 70 are closer to each other, so that the anti-peeping performance of the display module 200 is further improved.

Exemplarily, in a case where the backlight module 100 adopting the above-mentioned structure is applied to the display module 200, the anti-peeping viewing angle of the display module 200 is, for example, 0.5%@45°. The thickness of the dimming panel 602 is, for example, 0.125 mm, and the gap between the dimming panel 602 and the first polarizer 701 is, for example, 0.05 mm. The thickness of the display module 200 adopting this design is, for example, 0.65 mm. In this way, the overall thickness of the display module 200 is reduced while the anti-peeping performance of the display module 200 is improved.

The method of combining the dimming panel 602 and the first polarizer 701 into a one-piece structure is as follows. In some embodiments, an adhesive layer is provided on a surface of the dimming panel 602 proximate to the first polarizer 701, and the adhesive layer has adhesiveness and may be used to connect and fix the dimming panel 602 and the first polarizer 701. The dimming panel 602 is fixedly connected to the first polarizer 701 through the adhesive layer on the surface of the dimming panel 602.

In some other embodiments, an adhesive layer is provided between the dimming panel 602 and the first polarizer 701, and both surfaces of the adhesive layer are connected to the dimming panel 602 and the first polarizer 701 respectively, so that the dimming panel 602 is fixedly connected to the first polarizer 701. The adhesive layer may be made of hydrophobic adhesive. The adhesive layer is, for example, an annular adhesive that surrounds the edges of the dimming panel 602 and the first polarizer 701. A sealed space is defined by the opposite surfaces of the dimming panel 602 and the first polarizer 701 and the annular adhesive. In cooperation with the hydrophobicity of the annular adhesive, the aforementioned sealed space will not suffer from water intrusion due to reasons such as high external humidity, thereby preventing the display module from water stain defect.

In some embodiments, the display module further includes a backlight driver chip and a dimming driver chip. The backlight driver chip is electrically connected to the backlight module, and the dimming driver chip is electrically connected to the dimming panel. The backlight driver chip is configured to control the luminance of the backlight module, and the dimming driver chip is configured to control the angle of the light emitted by the dimming panel to control the display module to switch between the sharing state and the anti-peeping state.

Exemplarily, the dimming driver chip is configured to output a dimming driving signal to the dimming panel to control the angle of light emitted by the dimming panel. The information carried by the dimming driving signal includes the amplitude of the dimming driving voltage. The backlight driver chip is further configured to output a backlight driving signal to the backlight module to control the luminance of the backlight module. The information carried by the backlight driving signal includes the amplitude of the backlight driving current and the pulse width modulation ratio of the backlight driving current. The dimming driver chip is further configured to control the time at which the backlight driver chip outputs the backlight driving signal according to a preset delay time and the time at which the dimming driver chip outputs the dimming driving signal. That is to say, according to the preset delay time, after the dimming driver chip outputs the dimming driving signal to the dimming panel, the backlight driver chip outputs a backlight driving signal to the backlight module after waiting for the preset delay time.

The dimming driving voltage is used to drive the liquid crystal molecules in the dimming panel to deflect to a corresponding degree, thereby controlling the angle of the light emitted by the dimming panel. The amplitude of the backlight driving current and the pulse width modulation ratio of the backlight driving current are used for adjusting the luminance of the backlight module.

As shown in FIG. 6, while the dimming panel 602 changes the angle of the light emitted by the dimming panel 602, the normal transmittance of the dimming panel 602 also changes. Therefore, in a case where the backlight module 100 increases the same luminance of the backlight, as the dimming panel 602 adjusts the angle of light emitted by the dimming panel, the luminance of light passing through the dimming panel 602 and emitted toward the display panel 70 also changes.

Exemplarily, in a case where a high voltage (±12V) is applied to the dimming panel 602, the display module 200 is in the anti-peeping state, and the normal transmittance of the dimming panel is 90%; in a case where no voltage (0V) is applied to the dimming panel 602, the display module 200 is in the sharing state, and the normal transmittance of the dimming panel is 40%. In order to ensure the consistency of the display luminance of the display module 200, when the display module 200 switches between the sharing state and the anti-peeping state, the luminance of the backlight module 100 also needs to be adjusted accordingly.

Exemplarily, in the anti-peeping state, the normal transmittance of the dimming panel 602 is high, and the backlight driving current in the backlight module 100 needs to be reduced to reduce the brightness of the backlight module 100 to achieve the luminance of 150 nit of the display module; in a case of switching to the sharing state, the normal transmittance of the dimming panel 602 is reduced, and the backlight driving current in the backlight module 100 needs to be increased to increase the luminance of the backlight module 100 to achieve the luminance of 500 nit of the display module, thereby ensuring the consistency of the display luminance of the display module 200.

When switching from the sharing state to the anti-peeping state, since the response of the backlight driving current is fast, the luminance of the backlight module changes under the control of the backlight driving circuit; however, since it takes a certain amount of time for the liquid crystal molecules in the dimming panel to deflect due to the voltage driving, the response of the dimming driving voltage received by the dimming panel is slow, resulting in a certain time delay. In this way, in a case where the dimming driving signal and the backlight driving signal are output at the same time, the display luminance of the display module first decreases; then, in response to the dimming driving voltage, the normal transmittance of the dimming panel increases, and the display luminance of the display module further increases.

In a case of switching from the anti-peeping state to the sharing state, since the response of the backlight driving current is fast, and the response of the dimming driving voltage is slow, the display luminance of the display module first increases; then, in response to the dimming driving voltage, the normal transmittance of the dimming panel is reduced, and the display luminance of the display module is further reduced. This phenomenon is referred to as secondary screen flash.

In some embodiments of the present disclosure, by adopting a design of delay driving, there is a certain time difference between the output of backlight driving signal and the output of dimming driving signal. According to the preset delay time, the backlight driving signal and the dimming driving signal are separately output with a certain time difference, thereby solving the problem of secondary screen flash caused by the fast response of the backlight driving current and the slow response of the dimming driving voltage of the dimming panel.

It will be understood that the preset delay time matches the time required for the liquid crystal molecules in the dimming panel to complete deflection under the control of the corresponding dimming driving voltage.

In some embodiments, the dimming driver chip is electrically connected to the display panel and is configured to output a display driving signal to drive the display panel to display images.

Exemplarily, as shown in FIG. 6, the display module 200 has at least two different sharing states; and viewing angles for different sharing states are different. Both the backlight driver chip and the dimming driver chip store the anti-peeping mode and at least two different sharing modes; the backlight driver chip is configured to output corresponding backlight driving signals according to different display modes; the dimming driver chip is configured to output corresponding dimming driving signals according to different display modes.

By applying different dimming driving voltages to the dimming panel 602, the dimming panel 602 is allowed to scatter the collimated light 302b emitted from the backlight module 100 towards the dimming panel 602 to various degrees, i.e., change the light output angle, so that the light 302b passing through the dimming panel 602 and emitted toward the display panel 70 remains to be emitted toward the display panel perpendicularly (the light 302b as shown in FIG. 6 being emitted toward the dimming panel 602 perpendicularly and then emitted toward the display panel 70 perpendicularly); alternatively, the exit angle of the light (e.g. the light 3021, light 3022, light 3023 and light 3024) passing through the dimming panel 602 emitted to the display panel 70 is increased, so that the viewing angle of the display module is increased to various degrees.

Exemplarily, the display module 200 has multiple different sharing states, and viewing angles for different sharing states are different. Multiple sharing states may be set with different sharing levels as needed, that is, there is a different viewing angle for each sharing state. The greater the viewing angle, the higher the sharing level. Each different sharing state corresponds to a set of dimming driving signal and backlight driving signal. In a case of switching to a certain sharing state, the driver chip outputs a dimming driving signal and backlight driving signal corresponding to the sharing state, so that the angle of the light emitted from the dimming panel is the angle corresponding to the sharing state, and the luminance of the backlight provided by the backlight module is the luminance corresponding to the sharing state.

Some embodiments of the present disclosure provide an anti-peeping driving method for a display device. The dimming driver chip outputs a display driving signal to the display panel to control the display panel to display images. The dimming driver chip further controls the display module to switch between a sharing state and an anti-peeping state.

Figure 9:
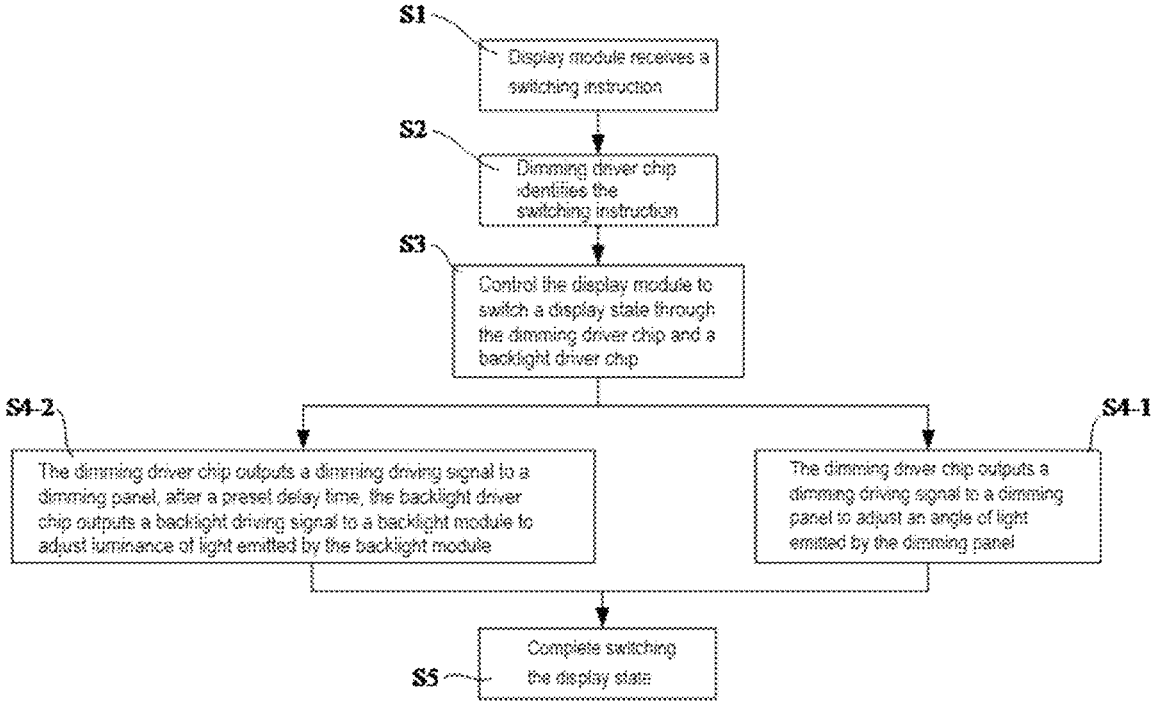
FIG. 9 is a flowchart of an anti-peeping driving method, in accordance with some embodiments.

The display panel 70 is used to display a target display image of the display module 200, and the target display image may be, for example, black, white, gray, or colour. When used, the dimming driver chip first outputs a display driving signal to the display panel, and the display panel displays the target image. The display state of the display module includes the sharing state and anti-peeping state, that is, the display mode of the display module includes a sharing mode and an anti-peeping mode; the sharing mode includes multiple sharing states with different sharing levels. The aforementioned different sharing levels refer to different viewing angles of the display module. A high sharing level means a wide viewing angle and a wide viewing range; correspondingly, a low sharing level means a small viewing angle and a narrow viewing range. In a case where there is a need to switch the display state of the display module, as shown in FIG. 9, the following steps are included specifically.

In S1, the display module receives a switching instruction.

Exemplarily, in this step, the user may output a switching instruction to the display module.

In S2, the dimming driver chip identifies the switching instruction.

The instruction identification information includes the current display state of the display module and the target display state to be switched. The display state refers to the sharing state or anti-peeping state of the display module.

In a case where the current display state is consistent with the target display state to be switched, the dimming driving signal output by the dimming driver chip to the dimming panel remains unchanged, and the backlight driving signal output by the backlight driver chip to the backlight module remains unchanged.

In a case where the current display state is inconsistent with the target display state to be switched, the dimming driver chip outputs a dimming driving signal to the dimming panel, and after a preset time, the backlight driver chip outputs a backlight driving signal to the backlight module. The preset time is determined based on the current display state and the target display state. In a case of switching between different display states, the time interval between the output of the dimming driving signal and the backlight driving signal is different.

In S3, the display module is controlled to switch the display state through the dimming driver chip and the backlight driver chip.

In S4-1, the dimming driver chip outputs the dimming driving signal to the dimming panel to adjust the angle of the light emitted by the dimming panel. The information carried by the dimming driving signal includes the amplitude of the dimming driving voltage.

In S4-2, the dimming driver chip outputs the dimming driving signal to the dimming panel, after a preset delay time, the backlight driver chip outputs the backlight driving signal to the backlight module to adjust the luminance of light emitted by the backlight module. The information carried by the backlight driving signal includes the amplitude of the backlight driving current and the pulse width modulation ratio of the backlight driving current.

In S5, switching of the display state is completed.

It should be noted that S4-1 and S4-2 are not completed at the same time, and there is a certain time interval between the execution times of these two steps.

Exemplarily, the step S3, controlling the display module to switch display state through the dimming driver chip and the backlight driver chip, includes: controlling the display module to switch between the sharing state and the anti-peeping state through the dimming driver chip and the backlight driver chip.

Controlling the display module to switch between the sharing state and the anti-peeping state through the dimming driver chip and the backlight driver chip, includes: S3-1, controlling the display module to switch to the anti-peeping state through the dimming driver chip and the backlight driver chip; and S3-2, controlling the display module to switch to the sharing state through the dimming driver chip and the backlight driver chip.

S3-1, controlling the display module to switch to the anti-peeping state through the dimming driver chip and the backlight driver chip, includes:

outputting, by the dimming driver chip, an anti-peeping state dimming driving signal to the dimming panel to control the angle of light emitted by the dimming panel, the information carried by the anti-peeping state dimming driving signal including the amplitude of the anti-peeping state dimming driving voltage; and according to the time when the dimming driver chip outputs the anti-peeping state dimming driving signal, outputting, by the backlight driver chip, an anti-peeping state backlight driving signal to the backlight module after a first preset time to control the luminance of the backlight module, the information carried by the anti-peeping state backlight driving signal including the amplitude of the anti-peeping state backlight driving current and a pulse width modulation ratio of the anti-peeping state backlight driving current.

S3-2, controlling the display module to switch to the sharing state through the dimming driver chip and the backlight driver chip, includes:

outputting, by the dimming driver chip, a sharing state dimming driving signal to the dimming panel to control the angle of light emitted by the dimming panel, the information carried by the sharing state dimming driving signal including the amplitude of the sharing state dimming driving voltage; and according to the time when the dimming driver chip outputs the sharing state dimming driving signal, outputting, by the backlight driver chip, the sharing state backlight driving signal to the backlight module after a second preset time to control the luminance of the backlight module, the information carried by the sharing state backlight driving signal including the amplitude of the sharing state backlight driving current and a pulse width modulation ratio of the sharing state backlight driving current.

The amplitude of the anti-peeping state dimming driving voltage is greater than the amplitude of the sharing state dimming driving voltage, the amplitude of the anti-peeping state backlight driving current is equal to the amplitude of the sharing state backlight driving current, and the pulse width modulation ratio of the anti-peeping state backlight driving current is less than the pulse width modulation ratio of the sharing state backlight driving current. The preset delay time is related to the time required for the liquid crystal molecules in the dimming panel to deflect. Therefore, the light output angle of the dimming panel in the sharing state is greater than that in the anti-peeping state, i.e., the light is more divergent, and the luminance of the backlight module in the sharing state is less than that in the anti-peeping state, and thus, the viewing angle of the display module in the sharing state is greater than the viewing angle of the display module in the anti-peeping state.

In a case of switching from the sharing state to the anti-peeping state, the backlight driving signal and the dimming driving signal are output at the same time. In this case, since the response of the backlight driving current is fast, and the response of the dimming driving voltage of the dimming panel is slow, the display luminance of the display module first decreases; then, in response to the dimming driving voltage, the normal transmittance of the dimming panel increases, and the display luminance of the display module further increases. In a case of switching from the anti-peeping state to the sharing state, the backlight driving signal and the dimming driving signal are output at the same time. In this case, since the response of the backlight driving current is fast, and the response of the dimming driving voltage is slow, the display luminance of the display module first increases; then, in response to the dimming driving voltage, the normal transmittance of the dimming panel decreases, and the display luminance of the display module further decreases. This phenomenon is referred to as secondary screen flash. By adopting such the design of delay driving, the driver chip separately outputs the backlight driving signal and the dimming driving signal with a certain time difference according to the preset delay time, thereby solving the problem of secondary screen flash caused by the fast response of the backlight driving current and the slow response of the dimming driving voltage of the dimming panel.

Exemplarily, the display module has at least two different sharing states, and the viewing angles for the different sharing states are different; the different viewing angles refer to the different ranges of viewing angle of the display module, i.e., the different viewing ranges of the display module.

S3-2, controlling the display module to switch to the sharing state through the dimming driver chip and the backlight driver chip, includes: S3-2-1, controlling, by the dimming driver chip and the backlight driver chip, the display module to switch to a different sharing state.

S3-2-1, controlling, by the dimming driver chip and the backlight driver chip, the display module to switch to a different sharing state, includes:

outputting, by the dimming driver chip, a corresponding dimming driving signal to the dimming panel according to the different sharing state; and according to a corresponding preset delay time, outputting, by the backlight driver chip, a corresponding sharing state backlight driving signal to the backlight module after the dimming driver chip outputs the corresponding dimming driving signal and delaying for the preset delay time.

The viewing angle of the display module in a different sharing state is positively correlated with the luminance of the backlight module, the pulse width modulation ratio of the backlight driving current and the duration of the preset delay time, and is negatively correlated with the amplitude of the dimming driving voltage.

The change of the dimming driving signal is used to control the light output angle of the dimming panel, and the change of the backlight driving signal is used to control the luminance of the backlight module.

Exemplarily, the display module has four sharing states with different sharing levels, for example, a first sharing state, a second sharing state, a third sharing state, and a fourth sharing state that are ranked by the sharing level from low to high. The sharing level refers to the size of the viewing angle/viewing range of the display module. A high sharing level means a wide range of viewing angle and a wide viewing range of the display module. In this case, the display state of the display module includes an anti-peeping state, the first sharing state, the second sharing state, the third sharing state, and the fourth sharing state that are ranked by the sharing level from low to high. It will be understood that, in a case where the display state of the display module is in the anti-peeping state, the viewing angle/viewing range of the display module is the smallest; and in a case where the display state of the display module is in the fourth sharing state, the viewing angle/viewing range of the display module is the greatest.

The display module corresponds to a set of control data in each different sharing state. The control data includes the dimming driving signal sent by the dimming driver chip and the backlight driving signal sent by the backlight driver chip.

In a case where the display state of the display module switches between different sharing states, it will be understood that, both the dimming driving signal sent by the dimming driver chip and the backlight driving signal sent by the backlight driver chip are different.

In a case of switching between two different sets of control data, i.e., in a case where the display state of the display module changes, switching adjustment data is further included. The switching adjustment data includes the time difference between the dimming driver chip outputting the dimming driving signal and the backlight driver chip outputting the backlight driving signal. The time difference between the dimming driver chip outputting the dimming driving signal and the backlight driver chip outputting the backlight driving signal means that when the display state of the display module changes, for example, the display state of the display module switches from the anti-peeping state to the first sharing state or from the fourth sharing state to the second sharing state, the dimming driver chip first outputs the dimming driving signal for adjusting the angle of light emitted by the dimming panel to a target angle, and after a preset delay time, the backlight driver chip then outputs the backlight driving signal for adjusting the luminance of the backlight module to a target luminance. In this way, the problem of the secondary screen flash caused by a fact that the response speed of the backlight driving signal is faster than the display driving signal is solved. The dimming driving signal includes the amplitude of the dimming driving voltage; the backlight driving signal includes the amplitude of the backlight driving current and the pulse width modulation ratio of the backlight driving current.

Considering an example in which the anti-peeping state is the initial display state of the display module. In this case, the dimming driver chip outputs an anti-peeping dimming driving signal to the dimming panel, and the backlight driver chip outputs an anti-peeping backlight driving signal to the backlight module; the anti-peeping dimming driving signal includes the amplitude of the driving voltage for the dimming panel in the anti-peeping state; the anti-peeping backlight driving signal includes a pulse width modulation ratio of the backlight driving current in the backlight module in the anti-peeping state. Exemplarily, in a case where the display state of the display module is the anti-peeping state, the amplitude of the driving voltage for the dimming panel is ±12V, and the pulse width modulation ratio of the backlight driving current in the backlight module is 12%. In this case, the luminance of the display module is 150 nit, and the viewing angle of the display module is 0.4%.

It should be noted that the dimming panel in the present disclosure may be, for example, a polymer dispersed liquid crystal (PDLC) panel. Optionally, in a case where the display module is in the anti-peeping state, for the dimming panel, voltage is applied to the upper and lower driving electrodes of the PDLC (PDLC is sandwiched between the upper and lower electrodes); and in a case where the display module is in the sharing state, no voltage is applied to the upper and lower driving electrodes of the PDLC (PDLC is sandwiched between the upper and lower electrodes). In this present disclosure, multiple corresponding anti-peeping states-sharing states may be set. In a case where the maximum driving voltage is applied, the display module is in an anti-peeping state; and in a case where no voltage is applied to the upper and lower driving electrodes of the PDLC, the display module is in an extreme sharing state (the viewing range of display module is the widest and the viewing angle of the display module is the greatest). The extreme sharing state may correspond to, for example, the fourth sharing state mentioned above. Therefore, if the display range is between the anti-peeping state and the extreme sharing state, multiple intermediate sharing states with different display ranges may be included, such as intermediate sharing states corresponding to the first sharing state, the second sharing state, and the third sharing state mentioned above. In each sharing state with a different display range, the pulse width modulation ratio of the backlight driving current may be a different ratio of the extreme sharing state. For example, the pulse width modulation ratio of the backlight driving current in the backlight module is 12%, which refers to 12% of the backlight current in the extreme sharing state. In addition, as it approaches the extreme sharing state, the pulse width modulation ratio of the backlight driving current gradually increases, and the delay time of the backlight driver chip outputting the backlight driving signal relative to the dimming driver chip outputting the dimming driving signal also gradually increases.

In a case where the display state of the display module switches from the anti-peeping state to the first sharing state, the dimming driver chip first outputs a first dimming driving signal to the dimming panel, and after a first preset delay time, the backlight driver chip then outputs a first backlight driving signal to the backlight module. The first dimming driving signal includes the amplitude of the driving voltage for the dimming panel in the first sharing state; and the first backlight driving signal includes the pulse width modulation ratio of the backlight driving current in the backlight module in the first sharing state.

Exemplarily, the first preset delay time is 4 ms; after the dimming driver chip outputs the first dimming driving signal, and the dimming panel receives the first dimming driving signal, the amplitude of the driving voltage for the dimming panel is switched from ±12 V to ±9 V; 4 ms after the dimming driver chip outputs the first dimming driving signal, the backlight driver chip outputs a first backlight driving signal to the backlight module, and after the backlight module receives the first backlight driving signal, the pulse width modulation ratio of the backlight driving current in the backlight module is switched from 12% to 35%, correspondingly, in this case, the luminance of the display module is switched from 150 nit to 300 nit, and the viewing angle of the display module is changed from 0.4% to 1.2%.

In a case where the display state of the display module switches from the anti-peeping state to the second sharing state, the dimming driver chip outputs a second dimming driving signal to the dimming panel, and after a second preset delay time, the backlight driver chip then outputs a second backlight driving signal to the backlight module. The second dimming driving signal includes the amplitude of the driving voltage for the dimming panel in the second sharing state; and the second backlight driving signal includes the pulse width modulation ratio of the backlight driving current in the backlight module in the second sharing state.

Exemplarily, the second preset delay time is 6 ms; the dimming driver chip outputs a second dimming driving signal, and after the dimming panel receives the second dimming driving signal, the amplitude of the driving voltage for the dimming panel is switched from ±9 V to ±6 V; 6 ms after the dimming driver chip outputs the second dimming driving signal, the backlight driver chip outputs a second backlight driving signal to the backlight module, and after the backlight module receives the second backlight driving signal, the pulse width modulation ratio of the backlight driving current in the backlight module is switched from 35% to 50%, correspondingly, in this case, the luminance of the display module is 300 nit, and the viewing angle of the display module is changed from 1.2% to 2.4%.

In a case where the display state of the display module switches from the anti-peeping state to the third sharing state, the dimming driver chip outputs a third dimming driving signal to the dimming panel, and after a third preset delay time, the backlight driver chip then outputs a third backlight driving signal to the backlight module. The third dimming driving signal includes the amplitude of the driving voltage for the dimming panel in the third sharing state; and the third backlight driving signal includes the pulse width modulation ratio of the backlight driving current in the backlight module in the third sharing state.

Exemplarily, the third preset delay time is 9 ms; the dimming driver chip outputs a third dimming driving signal, and after the dimming panel receives the third dimming driving signal, the amplitude of the driving voltage for the dimming panel is switched from ±6 V to ±3 V; 9 ms after the dimming driver chip sends out the third dimming driving signal, the backlight driver chip outputs a third backlight driving signal to the backlight module, and after the backlight module receives the third backlight driving signal, the pulse width modulation ratio of the backlight driving current in the backlight module is switched from 50% to 85%, correspondingly, in this case, the luminance of the display module is switched from 300 nit to 500 nit, and the viewing angle of the display module is changed from 2.4% to 3.6%.

In a case where the display state of the display module switches from the anti-peeping state to the fourth sharing state, the dimming driver chip outputs a fourth dimming driving signal to the dimming panel, and after a fourth preset delay time, the backlight driver chip then outputs a fourth backlight driving signal to the backlight module. The fourth dimming driving signal includes the amplitude of the driving voltage for the dimming panel in the fourth sharing state; and the fourth backlight driving signal includes the pulse width modulation ratio of the backlight driving current in the backlight module in the fourth sharing state.

Exemplarily, the fourth preset delay time is, for example, 13 ms; the dimming driver chip outputs a fourth dimming driving signal, and after the dimming panel receives the fourth dimming driving signal, the amplitude of the driving voltage for the dimming panel is switched, for example, from ±3 V to ±0 V, that is, no voltage is applied to the dimming panel; 13 ms after the dimming driver chip sends out the fourth dimming driving signal, the backlight driver chip outputs a fourth backlight driving signal to the backlight module, and after the backlight module receives the fourth backlight driving signal, the pulse width modulation ratio of the backlight driving current in the backlight module is switched, for example, from 85% to 100%, correspondingly, in this case, the luminance of the display module is 500 nit, and the viewing angle of the display module is changed, for example, from 3.6% to 4.8%.

The foregoing descriptions are merely specific implementations of the present disclosure, but the protection scope of the present disclosure is not limited thereto, any variations or substitutions that those skilled in the art could conceive of within the technical scope of the present disclosure shall fall within the protection scope of the present disclosure. Therefore, the protection scope of the present disclosure shall be subject to the protection scope of the claims.

What is claimed is:

1. A backlight module, comprising:
a light guide plate; and
a prismatic reflective film disposed on a surface of the light guide plate opposite to a light exit surface of the light guide plate, a surface of the reflective film proximate to the light guide plate being provided with a plurality of protruding structures thereon, the plurality of protruding structures extending in a first direction;
wherein tops of at least two of the plurality of protruding structures are uneven; and a protruding structure of the plurality of protruding structures includes a first surface and a second surface that intersect, a position where the first surface and the second surface intersect is a top of the protruding structure, and at least one of the first surface and the second surface is a wavy curved surface.

2. The backlight module according to claim 1, wherein the prismatic reflective film includes a base film and the plurality of protruding structures disposed on a side of the base film;

wherein in a first sectional view obtained by taking a cross-section perpendicular to the base film and parallel to the first direction and passing through the top of the protruding structure of the plurality of protruding structures, the top of the protruding structure is wavy.

3. The backlight module according to claim 2, wherein in the first sectional view, a distance between the top of the protruding structure and the base film changes cyclically, the top of the protruding structure has at least two highest positions and at least two lowest positions, and the at least two highest positions and the at least two lowest positions are alternately arranged.

4. The backlight module according to claim 2, wherein the base film is a soft resin base, and a thickness of the base film is in a range from 30 μm to 200 μm, inclusive.

5. The backlight module according to claim 2, wherein in the first sectional view, a difference between a distance between a highest position of the top of the protruding structure and the base film and a distance between a lowest position of the top of the protruding structure and the base film is less than half of the distance between the highest position and the base film.

6. The backlight module according to claim 1, wherein the plurality of protruding structures are arranged in a second direction, and the second direction intersects the first direction; in a second sectional view obtained by taking a cross-section perpendicular to a base film included in the prismatic reflective film and parallel to the second direction, a distance between tops of each two adjacent protruding structures is same.

7. The backlight module according to claim 6, wherein in the second sectional view, the top of the protruding structure of the plurality of protruding structures has a rounded corner.

8. The backlight module according to claim 1, wherein the plurality of protruding structures include a plurality of first protruding structures and a plurality of second protruding structures, shapes of a first protruding structure of the plurality of first protruding structures and a second protruding structure of the plurality of second protruding structures are different, and the plurality of first protruding structures and the plurality of second protruding structures are alternately arranged in a second direction;

wherein the second direction intersects the first direction.

9. The backlight module according to claim 1, wherein the backlight module further comprises:

a backplate disposed on a side of the prismatic reflective film away from the light guide plate, wherein a surface of the backplate is provided with a light-absorbing coating thereon.

10. The backlight module according to claim 1, wherein the backlight module further comprises:

a light source including a base plate and a light-emitting device disposed on the base plate, wherein the light-emitting device is disposed at an end of the light guide plate, and the base plate is disposed on a surface of the light guide plate opposite to the light exit surface of the light guide plate and is disposed at an end of the prismatic reflective film;

overlapping portions of the base plate and the light guide plate are connected by a first adhesive layer;

a second adhesive layer is provided on at least a position where a surface of the base plate away from the light guide plate and a surface of the prismatic reflective film away from the light guide plate are close to each other.

11. A display module, comprising:

the backlight module according to claim 1, wherein the light guide plate is a collimated light guide plate, and the light guide plate is configured to emit light entering an interior of the light guide plate perpendicularly from the light exit surface;

a dimming structure disposed on a light exit surface of the backlight module, wherein the dimming structure is used to adjust an angle of light emitted from the light exit surface of the light guide plate; and a display panel disposed on a side of the dimming structure away from the backlight module, wherein the display panel is used to perform display by using light emitted by the dimming panel.

12. The display module according to claim 11, wherein the display panel includes a first polarizer, a display liquid crystal panel and a second polarizer that are stacked in sequence, and the first polarizer is closer to the backlight module than the second polarizer; and the dimming structure includes a dimming panel and a dimming film, and the dimming film is disposed on a side of the dimming panel away from the display panel; wherein the display panel and the first polarizer are combined into a one-piece structure; or the dimming film, the dimming panel and the first polarizer are combined in to a one-piece structure.

13. The display module according to claim 11, wherein the display module further comprises a backlight driver chip and a light dimming driver chip, the backlight driver chip being electrically connected to the backlight module, and the dimming driver chip being electrically connected to the dimming panel; wherein the backlight driver chip is configured to control a luminance of the backlight module, the dimming driver chip is configured to control an angle of light emitted by the dimming panel to control the display module to switch between a sharing state and an anti-peeping state.

14. The display module according to claim 13, wherein the dimming driver chip is configured to output a dimming driving signal to the dimming panel to control the angle of light emitted by the dimming panel; information carried by the dimming drive signal includes an amplitude of light dimming driving voltage;

the backlight driver chip is configured to output a backlight driving signal to the backlight module to control the luminance of the backlight module; information carried by the backlight driving signal includes an amplitude of backlight driving current and a pulse width modulation ratio of the backlight driving current; and the dimming driver chip is further configured to control a time when the backlight driver chip outputs the backlight driving signal according to a preset delay time and a time when the dimming driver chip outputs the dimming driving signal.

15. The display module according to claim 13, wherein the display module has at least two different sharing states, and viewing angles for different sharing states are different;

both the backlight driver chip and the dimming driver chip store an anti-peeping mode and at least two different sharing modes; the backlight driver chip is configured to output a corresponding backlight driving signal according to a different display mode; the dimming driver chip is configured to output a corresponding dimming driving signal according to a different display mode.

16. A display device, comprising the display module according to claim 11.

17. An anti-peeping driving method, comprising: controlling a display module to switch between a sharing state and an anti-peeping state through a dimming driver chip and a backlight driver chip.

18. The anti-peeping driving method according to claim 17, wherein controlling the display module to switch between the sharing state and the anti-peeping state through the dimming driver chip and the backlight driver chip, includes: controlling the display module to switch to the anti-peeping state through the dimming driver chip and the backlight driver chip; and controlling the display module to switch to the sharing state through the dimming driver chip and the backlight driver chip; wherein controlling the display module to switch to the anti-peeping state through the dimming driver chip and the backlight driver chip, includes:

outputting, by the dimming driver chip, an anti-peeping state dimming driving signal to the dimming panel to control an angle of light emitted by the dimming panel, wherein information carried by the anti-peeping state dimming driving signal includes an amplitude of anti-peeping state dimming driving voltage; and according to a time when the dimming driver chip outputs the anti-peeping state dimming driving signal, outputting, by the backlight driver chip, an anti-peeping state backlight driving signal to the backlight module after a first preset time to control a luminance of the backlight module, wherein information carried by the anti-peeping state backlight driving signal includes an amplitude of an anti-peeping state backlight driving current and a pulse width modulation ratio of the anti-peeping state backlight driving current;

controlling the display module to switch to the sharing state through the dimming driver chip and the backlight driver chip, includes:

outputting, by the dimming driver chip, a sharing state dimming driving signal to the dimming panel to control the angle of the light emitted by the dimming panel, wherein information carried by the sharing state dimming driving signal includes an amplitude of a sharing state dimming driving voltage; and according to the time when the dimming driver chip outputs the sharing state dimming driving signal, outputting, by the dimming driver chip, a sharing state backlight driving signal to the backlight module after a second preset time to control the luminance of the backlight module, wherein information carried by the sharing state backlight driving signal includes an amplitude of a sharing state backlight driving current and a pulse width modulation ratio of the sharing state backlight driving current;

wherein the amplitude of the anti-peeping state dimming driving voltage is greater than the amplitude of sharing state dimming driving voltage, the amplitude of the anti-peeping state backlight driving current is equal to the amplitude of the sharing state backlight driving current, and the pulse width modulation ratio of the anti-peeping state backlight driving current is less than the pulse width modulation ratio of the sharing state backlight driving current.

19. A backlight module, comprising:

a light guide plate; and a prismatic reflective film disposed on a surface of the light guide plate opposite to a light exit surface of the light guide plate, a surface of the reflective film proximate to the light guide plate being provided with a plurality of protruding structures thereon, the plurality of protruding structures extending in a first direction;

wherein tops of at least two of the plurality of protruding structures are uneven; and the plurality of protruding structures include a plurality of first protruding structures and a plurality of second protruding structures, shapes of a first protruding structure of the plurality of first protruding structures and a second protruding structure of the plurality of second protruding structures are different, and the plurality of first protruding structures and the plurality of second protruding structures are alternately arranged in a second direction; the second direction intersects the first direction.

20. The display module according to claim 19, wherein a highest position of the first protruding structure in a third sectional view obtained by taking a cross-section perpendicular to a base film included in the prismatic reflective film and parallel to the first direction and passing through a top of the first protruding structure, corresponds to, a lowest position of the second protruding structure in a fourth sectional view obtained by taking a cross-section perpendicular to the base film and parallel to the first direction and passing through a top of the second protruding structure, in the second direction.

* * * * *